Patented Feb. 19, 1952

2,586,295

UNITED STATES PATENT OFFICE 2,586,295

RECOVERY OF NITROGENOUS AND OTHER COMPOUNDS

Robert J. Brown, Alpheus R. Nees, and Arthur N. Bennett, Denver, Colo., assignors to The Great Western Sugar Company, Denver, Colo., a corporation of New Jersey No Drawing. Application August 9, 1946,
Serial No. 689,518

8 Claims. (Cl. 260—501)

This invention relates to processes for obtaining nitrogenous organic compounds of increased purity from various aqueous mixtures containing the same, and more specifically, to processes for obtaining betaine and other nitrogenous organic compounds from sugar waste products and other like solutions.

In the United States Patent No. 2,375,165 issued to two of the present applicants, a process is described for the recovery and concentration of betaine, glutamic acid and other valuable nitrogenous compounds from sugar waste solutions containing such compounds in admixture with various inorganic salts and non-nitrogenous organic compounds. The process employed involves a series of steps comprising essentially, passing the waste solution through a bed or column of any of a number of hydrogen ion exchanger materials and separately collecting an intermediate fraction containing a substantial portion of the desirable nitrogenous compounds in addition to lesser amounts of organic or inorganic acids, non-nitrogenous organic compounds and only about 10% of the inorganic impurities or ash present in the original solution. Although this product represents a substantial purification and concentration of the nitrogenous compounds of the original solution, the presence of the remaining undesirable organic and inorganic impurities interferes with the subsequent recovery of betaine, glutamic acid and other products in substantially pure form.

An object of the present invention is to recover betaine, glutamic acid and other amino and nitrogenous compounds in solutions substantially free from inorganic and non-nitrogenous organic compounds. Another object is to obtain the said nitrogenous compounds in solutions of richer concentration such that the cost of evaporation of the water content heretofore required is greatly reduced. Yet another object is to obtain an increased yield of valuable nitrogenous compounds at a lower cost through simplification of the process of separation of such compounds from the impurities.

From superficial consideration, it would appear that repetition of the fractionation procedure described in the aforementioned patent would accomplish further purification and concentration of the desirable nitrogenous organic compounds, that is, by passing the enriched nitrogen fraction through a fresh hydrogen ion exchanger bed and collecting a still more highly enriched nitrogen fraction as a part of the effluent resulting from the bed. In actual practice, however, it has been found that this repetition does not result in any substantial increased enrichment, for the nitrogenous compounds, although bound and held by the exchanger in the expected quantities, are released quite slowly, the result being that concentration of the nitrogenous compounds in the effluent is not materially increased.

In accordance with a specific embodiment of the present invention, the aqueous solution constituting the fraction enriched in nitrogenous compounds, as obtained in the process of the foregoing patent, is contacted with a suitable hydrogen ion exchanger material which adsorbs the nitrogenous organic compounds in preference to other organic compounds or impurities, and before the said nitrogenous compounds are desorbed or become released in the solution due to replacement by other ions the contact between the exchanger material and the solution is discontinued. The nitrogenous organic compounds adsorbed in the bed are then separated from the exchanger material. Since the acids and any other non-nitrogenous organic compounds are not adsorbed in this process, these compounds remain in the residual solution which passes through and out of the bed, and therefore upon the desorption of the organic nitrogenous compounds from the bed a product is obtained substantially free of the non-nitrogenous organic compounds.

More specifically, the above process is carried out by passing the enriched aqueous solution containing the betaine and other nitrogenous organic compounds through a bed of the hydrogen ion exchanger material and discontinuing such passage before the adsorption capacity of the exchanger material for the nitrogenous organic compounds is exceeded.

In this process the exchanger material adsorbs inorganic compounds as well as the desired nitrogenous compounds. A special feature of the present invention consists of a process by which these nitrogenous compounds are selectively desorbed from the pregnant bed. We have discovered that this can be accomplished very effectually by passing a dilute aqueous solution of a weak alkali, such as ammonia, through the bed. Only a relatively small amount of such solution is required to accomplish the desorption. In practical operation, the effluent of the ammonia or other desorbing solution passing from the bed is preferably divided into two fractions. The first fraction contains the nitrogenous compounds in comparatively high concentration. The second fraction contains such compounds in lesser concentration, and this fraction is recycled in the process for use in desorbing an additional quantity of nitrogenous compounds in a subsequent run of the process. By employing this procedure of collecting two fractions, a more highly concentrated solution of the nitrogenous compounds is obtained as the principal product of the process and, at the same time, substantially none of such compounds is lost in the exchanger bed. Hence high yields are obtained.

The process of the present invention is not limited to the treatment of the enriched fraction obtained by the process of the aforementioned patent, for it is applicable to the treatment of other aqueous solutions containing adsorbable nitrogen compounds in admixture with non-adsorbable compounds or with adsorbable inorganic compounds. The process is applicable, for example, to solutions of waste products directly resulting from the operation of the so-called Steffen process and the barium process for desugarizing sugar beet molasses, and to impure nitrogenous solutions in general which occur in the manufacture of sugar from beets. It is also applicable to solutions resulting from the hydrolysis of animal and vegetable proteins and to other materials of like nature.

For the practice of the present invention, numerous hydrogen ion exchanger materials are available, among which are those descibed in an article of Robert J. Meyers et al., published in Industrial and Engineering Chemistry, vol. 33, pages 697–706 (1941). Suitable examples of such materials, for use as described herein, are the substances sold under the trade names "Ionac C-200" and "Ionac C-284M" (by American Cyanamide and Chemical Corporation), "Duolite C-1" and "Duolite C-3" (by Chemical Process Company), "Nalcite A" (by National Aluminate Corporation), "Catex," (by the International Filters Corporation), "Zeo-Karb" (by the Permutit Company), and "Amberlite IR-1" (by Resinous Products and Chemical Co., Inc.).

The above-mentioned are resinous or carbonaceous cation exchangers which, when regenerated in a hydrogen cycle, have the ability to combine with cations such as sodium, calcium and potassium and others and to release at the same time a chemically equivalent amount of hydrogen ions, and furthermore they have the ability selectively to adsorb nitrogenous compounds such as betaine, glutamic acid and other amino acids and similar substances as described in the aforementioned patent. Among the most suitable forms of resinous cation exchangers are the types known as sulfonated phenol-aldehyde condensation products, such, for example, as those disclosed in United States Patent No. 2,191,853 and those disclosed in the article above-mentioned. The carbonaceous cation exchangers are generally less effective, but useful. Materials of this type are disclosed in United States Patents Nos. 2,191,060 and 2,376,896, and others.

The instant invention is not limited to the use of ammonia for selectively desorbing the nitrogenous compounds in the ion exchanger bed. The selective desorption or release may be effectively accomplished by a solution of a weak base, such as a mono-, di-, or tri-methyl amine.

Example

An enriched nitrogen fraction obtained from Steffen waste water by application of the process described in the aforementioned patent, containing in addition to betaine and other desirable nitrogenous compounds, organic and inorganic acids, non-nitrogenous organic compounds and some inorganic compounds or ash, is passed through a bed or column of a hydrogen ion exchanger material of the nature hereinbefore described. This passage is continued until the volume of solution contacted with the bed is equal to or slightly less than that which substantially saturates the ion exchanger material as far as is possible with the adsorbable nitrogenous components of the solution, the material then containing substantially only the nitrogenous compounds and the ash in adsorbed condition.

After the residual solution containing non-adsorbable compounds has been separated by washing with water, the adsorbed nitrogen compounds and inorganic cations which remain in the exchanger material are successively desorbed. The nitrogenous compounds are selectively desorbed and removed by washing the bed with a dilute solution of ammonia containing suitably from 2% to 4% ammonia. A quantity of the effluent of such ammonia solution is first collected which provides a solution which is enriched four to five times in its nitrogen compound concentration over that of the original aqueous solution of the nitrogenous compounds passed through the exchanger bed. This effluent contains substantially no ash and only a small quantity of the non-nitrogenous impurities. A second effluent fraction obtained recovers most of the remaining content of nitrogenous compounds adsorbed in the exchanger material. This less enriched fraction contains substantially all of the remaining nitrogenous compounds, thereby providing for substantially total recovery. Because of an excess of ammonia in this second fraction, it can be employed for the desorption of additional nitrogenous compounds from a subsequently obtained bed of exchanger material containing adsorbed nitrogenous compounds. Preferably, the second fraction is further fortified by the addition of ammonia before it is again employed. Through this procedure, the loss of valuable nitrogen compounds is substantially avoided and the ammonia solution is used to its full capacity.

The ion exchanger bed from which the nitrogenous compounds have been desorbed is then treated to recover the adsorbed inorganic materials and to regenerate the hydrogen ion exchanger material for reuse in the process. These ends are accomplished by first displacing the residual ammonia solution with water and then treating the bed with a suitable acid solution. The acid solution preferably employed is composed in part of the acidic effluent obtained in the course of the present process from the impure solution originally passed through the exchanger bed, and in part of any suitable acid, such as sulfuric acid. The regenerated bed of ion exchanger material may be reused in the process for the treatment of a subsequent quantity of impure solution of the nitrogenous compounds.

The purified and concentrated solution of betaine and other nitrogenous compounds is then treated by any suitable process, not constituting part of the present invention, for the recovery of the various organic compounds therein, namely betaine, glutamic acid, l-leucine, l-isoleucine, tyrosine and others. Whatever the process employed in this purification, its accomplishment is greatly simplified due to the substantial absence of non-nitrogenous organic constituents and inorganic compounds or ash, and due, finally, to the comparatively small amount of water present amounting to from ¼ to ⅕ that of the aqueous solution of nitrogenous materials initially treated by the process.

The nature of the processes of the present invention may be better understood from a consideration of the phenomenon which appears to occur in the bed of the hydrogen ion exchanger material during progress of the process. When the impure solution containing the nitrogenous compounds is passed through the ion exchanger material, the cations of the ionized inorganic or ash constituents are immediately adsorbed in a zone near the top of the bed and the adsorbable nitrogen compounds pass through said zone and become adsorbed in the fresh exchanger material in a second zone immediately adjacent to or below the ash zone. The non-adsorbable organic compounds and the acids formed by the exchange process pass all the way through both zones and out of the bed. As the passage of the solution through the bed is continued the zone of inorganic cation adsorption moves forward toward the outlet, or downwardly, and if this action continued sufficiently it would eventually displace and release the adsorbed nitrogenous materials. In accordance with the process of the present invention, the passage of the solution through the bed is most advantageously discontinued when the amount of adsorbed nitrogenous compounds is at a maximum.

One of the outstanding features of the present invention is the ease and relative simplicity with which the process is controlled. First, the capacity of the hydrogen ion exchanger bed for the adsorbable consituents of the solution to be treated is determined by laboratory test. Then, when the plant process is operated, a volume of solution containing a determined quantity of adsorbable constituents is passed through the bed until the calculated adsorption capacity is reached. Thereafter, the control of the process is very easily accomplished through ascertainment of the acidity of the various effluents.

The first effluent from the ion exchanger bed during passage of the initial solution therethrough has a pH value of 1.5–3.0 but this value quickly drops to 1.0–1.5. The successful removal of the residual solution from the pregnant bed is indicated by a rise in the pH value from the last mentioned value to 3.2–3.4. During the ammonia wash treatment for the release of the nitrogenous compounds, the pH of the effluent drops to 2.7–2.9 and then begins to rise again. Prior to this last mentioned rise, the effluent is sent to acid storage to be used in conjunction with other acid solutions for the regeneration of the ion exchanger material as hereinbefore described. When the pH of the bed begins to rise, it is an indication that the effluent contains the desirable nitrogen compounds. The solution of greatly increased concentration of nitrogenous compounds is collected during the rise of the pH value to any final value between 5.0 and 10.0. The lower the value within this range, the greater the concentration, but the lesser the throughput recovery. The amount of ammonia run through the bed after the greatly enriched fracion is completed, is variable and is not critical, for after being sent to storage and being reinforced with fresh ammonia, it is used to release additional nitrogenous compounds in the succeeding run of the process.

The regeneration of the hydrogen ion exchanger material which immediately follows the ammonia desorption step is easily accomplished by treatment of the bed first with the acid fraction obtained in the hydrogen ion exchange operation, the same supplying from 20 to 30% of the acid requirement, and second, with a 5 to 10% solution of sulfuric acid or other suitable acid which completes the regeneration. The acid treatment is preferably followed by introduction into the bed of an amount of wash water to free the top part of the bed from excess acid. The remaining acid in the bed passes out with the effluent when the bed is reused in the process and such effluent becomes a part of the acid solution employed in regeneration.

The advantages of the process of the present invention may be summarized as follows:

Valuable nitrogen compounds, such as betaine, glutamic acid and other amino compounds are obtained in substantially pure form or in a form free from ash and non-nitrogenous organic compounds, the presence of which seriously interferes with and complicates their subsequent isolation and purification.

The process greatly reduces the cost of evaporation of water, the volume of the solution being reduced to ¼ to ⅕ of the volume of the original impure solution produced by the process of the aforementioned patent. As compared with the concentration of Steffen waste itself, the product of the present invention constitutes a reduction in the amount of evaporation to about $\frac{1}{16}$.

The yield of adsorbable nitrogen compounds is increased and, due to the simplicity of the process, the recovery is made at a lower cost.

The process is simple to operate and may be very easily controlled such that it will operate at highest efficiency. The regeneration and reuse of the ionic exchanger material and the employment of the acid byproducts represent important savings.

It should be understood that the present invention is not limited to the specific materials and to the exact procedures herein described but that it extends to all equivalents which will occur to those skilled in the art, within the scope of the claims appended hereto.

We claim:

1. A process for obtaining nitrogenous organic compounds including mono-amino acids from an impure aqueous solution containing the same in admixture with organic and inorganic impurities, which comprises passing such aqueous solution through a bed of cation exchanger material operable in the hydrogen cycle which adsorbs said nitrogenous organic compounds and inorganic impurities in preference to the organic impurities, discontinuing the passage of the solution through the bed before the adsorption of inorganic cations causes a reduction in the amount of adsorbed nitrogenous compounds, and thereafter passing a dilute solution of ammonia through the exchanger material thereby desorbing the adsorbed nitrogenous organic compounds and leaving inorganic compounds therein.

2. A process for obtaining nitrogenous organic compounds of increased purity and concentration from aqueous solutions of the same containing amino acids substantially only of monobasic character and organic and ionized inorganic impurities, comprising passing such a solution through a bed of cation exchanger material operable in the hydrogen cycle which adsorbs such nitrogenous organic compounds and inorganic cations, discontinuing the passage of said solution through the bed before the adsorption of inorganic cations causes a reduction in the amount of adsorbed nitrogenous compounds, and thereafter passing a dilute aqueous solution of ammonia of a lesser volume than the initial solution employed through the bed so as selectively to desorb the adsorbed nitrogenous compounds while leaving the adsorbed inorganic cations in the bed, thereby obtaining from the bed an effluent containing nitrogenous compounds including said amino acids in a purified and concentrated form.

3. A process for obtaining betaine, glutamic acid and other nitrogenous organic compounds of increased purity and concentration from a by-product of beet sugar manufacture containing the same with inorganic impurities, comprising passing a relatively dilute aqueous solution of such product through a bed of hydrogen ion exchanger material selected from the group consisting of resinous and carbonaceous cation exchangers operable in the hydrogen cycle which adsorbs from such solution betaine, glutamic acid and other desirable nitrogenous organic compounds and inorganic cations, discontinuing the passage of the solution through the bed when the capacity of the material to adsorb such compounds is substantially exhausted, then washing the residual solution from the bed, then passing a dilute aqueous solution of ammonia through the bed so as selectively to desorb the adsorbed betaine, glutamic acid and other nitrogenous compounds while leaving adsorbed inorganic cations in the bed, and dividing the effluent of the ammonia solution as it passes from the bed into successive fractions to obtain a fraction containing betaine, glutamic acid and such compounds in a relatively highly concentrated and purified form and another fraction containing the same in a purified and relatively less concentrated form.

4. In a process for the concentration and purification of nitrogenous organic compounds consisting principally of mono-amino acids, the steps which comprise passing an impure aqueous solution containing such nitrogenous organic compounds together with organic and inorganic impurities through a bed of cation exchanger material operable in the hydrogen cycle until such nitrogenous compounds have become adsorbed and then desorbed from the material, collecting as a separate fraction a portion of the resulting effluent which has a substantially increased concentration of the nitrogenous organic compounds as compared with the said impure solution, then passing said fraction through a fresh bed of cation exchanger material operable in the hydrogen cycle but discontinuing this step before the capacity of such bed to adsorb nitrogenous organic compounds from such fraction is exceeded, and thereafter passing a dilute aqueous solution of ammonia through such bed so as selectively to desorb the adsorbed nitrogenous organic compounds therefrom while leaving adsorbed inorganic cations therein, thereby obtaining from such bed an effluent containing such nitrogenous organic compounds in a concentrated and purified form.

5. In a process for the purification of nitrogenous organic compounds including mono-amino acids and obtaining the same in solutions of greater concentration, the steps which comprise passing an impure aqueous solution containing such nitrogenous organic compounds together with organic and inorganic impurities through a bed of cation exchanger material operable in the hydrogen cycle until the nitrogenous compounds initially adsorbed become desorbed, collecting as a separate fraction that portion of the resulting effluent which has an increased concentration of the nitrogenous organic compounds as compared with the said impure solution, then passing said fraction through a second bed of a cation exchanger material operable in the hydrogen cycle but discontinuing such passage before the adsorption of inorganic cations causes a reduction in the amount of adsorbed nitrogenous organic compounds, then washing the residue of said fraction from said second bed, and then separating the adsorbed nitrogenous compounds from said second bed and from the inorganic cations adsorbed therein by passing therethrough a dilute solution of ammonia.

6. In the separation of nitrogenous organic compounds including mono-amino acids from impure aqueous solutions of the same containing ionizing inorganic compounds and non-nitrogenous organic compounds, the improvement which comprises passing such solution through a bed of cation exchanger material operable in the hydrogen cycle thereby adsorbing inorganic cations from the solution, passing the resulting solution largely freed of inorganic cations into a bed of cation exchanger material operable in the hydrogen cycle only as long as adsorption of nitrogenous organic compounds from such resulting solution in the latter bed continues, thereby impregnating the latter bed with such nitrogenous organic compounds and inorganic cations, and thereafter passing a dilute solution of ammonia through the latter bed thereby obtaining therefrom an effluent containing the previously adsorbed nitrogenous compounds substantially freed of the inorganic and non-nitrogenous organic compounds.

7. The process of recovering nitrogenous compounds including mono-amino acids in more concentrated and purer form from an impure by-product solution of beet sugar manufacture containing such compounds together with organic and ionizing inorganic impurities, which comprises passing through a bed of cation exchanger material operable in the hydrogen cycle an amount of such solution sufficient substantially to saturate the bed with such compounds, until the pH of the resulting effluent has a value of 1.0–1.5, then washing the bed with an amount of water sufficient to remove the residual solution and then passing a dilute solution of ammonia into and through the bed, collecting as one fraction the acidic effluent resulting from the aforementioned steps until the effluent pH has begun to rise again after having once risen to 3.2–3.4 and then fallen to 2.7–2.9, and then continuing the passage of said base solution and collecting separately a second effluent fraction that follows until the pH of the effluent has reached a value of 5.0–10.0, said second fraction containing said nitrogenous compounds in a substantially concentrated and purified form.

8. In the separation of nitrogenous organic material including mono-amino acids from impure aqueous solutions of the same with non-nitrogenous organic materials and ionizable inorganic impurities by means of cation exchangers, the steps which comprise passing such an aqueous solution through a bed of cation exchanger operable in the hydrogen cycle, but before adsorption of inorganic cations causes a reduction in the amount of adsorbed nitrogenous organic material discontinuing such passage, then passing water through said bed to remove residual solution and collecting an acidic effluent fraction of the latter and the preceding solution effluent, then passing a dilute solution of ammonia through said bed thereby desorbing and obtaining the adsorbed nitrogenous compounds and leaving the inorganic ions adsorbed in the bed, next washing the bed with water, and then passing through the bed a regenerating acid solution containing the said acidic effluent fraction together with additional acid.

ROBERT J. BROWN.
ALPHEUS R. NEES.
ARTHUR N. BENNETT.

REFERENCES CITED

The following references are of record in the file of this patent:

UNITED STATES PATENTS

| Number | Name | Date |
|---|---|---|
| 2,375,164 | Bennett | May 1, 1945 |
| 2,375,165 | Nees et al. | May 1, 1945 |
| 2,386,926 | Block | Oct. 16, 1945 |
| 2,387,824 | Block | Oct. 30, 1945 |
| 2,413,791 | Shafor | Jan. 7, 1947 |
| 2,415,558 | Hesler et al. | Feb. 11, 1947 |
| 2,429,666 | Block | Oct. 28, 1947 |

OTHER REFERENCES

Freudenberg et al.: Naturwissanochaften, vol. 30, p. 87, (1942).

Griessbach: Melliandt-Textilbeuchte, vol. 20, pp. 577–579, (1939).

"Laboratory Technique in Organic Chemistry," Morton, McGraw-Hill, New York, (1938), p. 182.

Block Archives of Biochem., vol. 11, page 242 (1946).